(12) United States Patent
Forrester

(10) Patent No.: US 7,181,171 B2
(45) Date of Patent: Feb. 20, 2007

(54) SYSTEM AND METHOD FOR PROVIDING AUXILIARY RECEPTION IN A WIRELESS COMMUNICATIONS SYSTEM

(75) Inventor: Timothy David Forrester, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 555 days.

(21) Appl. No.: 09/909,748

(22) Filed: Jul. 20, 2001

(65) Prior Publication Data

US 2003/0017833 A1    Jan. 23, 2003

(51) Int. Cl.
*H04B 1/46* (2006.01)

(52) U.S. Cl. .......... 455/82; 455/83; 455/553.1; 455/293; 370/342; 342/357.1; 343/858; 343/860; 333/129

(58) Field of Classification Search ........ 455/456.1, 455/440, 427, 428, 82, 11.1, 12.1, 552.1, 455/13.3, 277.1, 278.1; 370/276, 277, 293, 370/297; 342/357.14, 357.08, 352, 357 R; 343/713, 725, 853
See application file for complete search history.

(56) References Cited

U.S. PATENT DOCUMENTS

| | | | |
|---|---|---|---|
| 5,532,702 A | | 7/1996 | Mintz |
| 5,535,430 A | * | 7/1996 | Aoki et al. ............ 455/552.1 |
| 5,805,113 A | * | 9/1998 | Ogino et al. ............ 343/713 |
| 5,977,928 A | | 11/1999 | Ying et al. |
| 6,097,974 A | * | 8/2000 | Camp et al. ............ 455/575.7 |
| 6,104,745 A | * | 8/2000 | Koh ...................... 375/130 |
| 6,208,844 B1 | | 3/2001 | Abdelgany |
| 6,208,861 B1 | * | 3/2001 | Suzuki .................... 455/441 |
| 6,218,984 B1 | * | 4/2001 | Longaker et al. ...... 342/357.14 |
| 6,275,475 B1 | * | 8/2001 | Emmons, Jr. ............ 370/276 |
| 6,298,243 B1 | * | 10/2001 | Basile ................... 455/552.1 |
| 6,317,608 B1 | * | 11/2001 | Glocker ................ 455/553.1 |
| 6,323,806 B1 | * | 11/2001 | Greving .................. 342/372 |
| 6,505,054 B1 | * | 1/2003 | Douglas et al. .......... 455/552.1 |
| 6,510,313 B1 | * | 1/2003 | Rapeli ..................... 455/323 |
| 6,542,722 B1 | * | 4/2003 | Sorrells et al. ............ 455/110 |
| 6,546,258 B1 | * | 4/2003 | Nohara et al. .......... 455/456.1 |
| 6,553,210 B1 | * | 4/2003 | Lindemann et al. ......... 455/82 |
| 6,600,931 B2 | * | 7/2003 | Sutton et al. ............ 455/552.1 |
| 6,658,237 B1 | * | 12/2003 | Rozenblit et al. ............ 455/83 |
| 6,667,723 B2 | * | 12/2003 | Forrester .................. 343/858 |
| 6,694,129 B2 | * | 2/2004 | Peterzell et al. ............ 455/76 |
| 6,694,150 B1 | * | 2/2004 | Standke et al. .......... 455/552.1 |
| 6,865,376 B2 | * | 3/2005 | Forrester .................... 455/73 |
| 6,973,307 B2 | * | 12/2005 | Forrester ................. 455/426.1 |
| 2003/0013469 A1 | * | 1/2003 | Forrester .................. 455/506 |

FOREIGN PATENT DOCUMENTS

| | | |
|---|---|---|
| EP | 1037482 A2 | 9/2000 |
| WO | WO 98/54849 | 12/1998 |
| WO | WO 01/47126 A2 | 6/2001 |
| WO | WO 01/59938 A2 | 8/2001 |

\* cited by examiner

*Primary Examiner*—Temica Beamer
*Assistant Examiner*—Joy K. Contee

(57) ABSTRACT

A system and method for providing auxiliary reception in a wireless communications system includes a wireless communications device. The wireless communications device includes a first antenna and a second antenna. The wireless communications device can, for example, establish two-way communications with a wireless communications network. The wireless communications device can also use the second antenna in at least one of a mobile assisted hand off (MAHO), a diversity antenna system and a global positioning system (GPS) system.

16 Claims, 5 Drawing Sheets

SYSTEM AND METHOD FOR PROVIDING AUXILIARY RECEPTION IN A WIRELESS COMMUNICATIONS SYSTEM

FIELD OF THE INVENTION

The present invention generally relates to a system and a method for providing auxiliary reception and, more specifically, to a system and a method for providing auxiliary reception in a wireless communications system.

BACKGROUND OF THE INVENTION

A signal received or transmitted by a wireless communications device in a wireless communications network is affected by many factors. For example, the distance from the wireless communications device to the nearest base station in the wireless communications network has a direct bearing on the strength of the received signal. In addition, environmental parameters tend to influence the quality of the received signal. Thus, for example, constructive and destructive interference due to multipath considerations can become accentuated in urban settings.

Conventional wireless communications devices have a single antenna for receiving and transmitting communications signals. If the conventional wireless communications device is receiving poor communications signals as a result of multipath signals in a particular environment, the user may be forced to move around in a random fashion in an attempt to find a location with improved reception. With that purpose in mind, the user may also be simultaneously orienting the wireless communications device and its single antenna in a myriad of directions. However, even such undesirable remedies may be unavailable under certain conditions such as, for example, when the user is unable to move freely or to perform burdensome tasks such as orienting the wireless communications device.

Conventional communications devices can also employ the antenna in a mobile assisted hand off (MAHO). As the wireless communications device moves between cells in wireless communications network, the received signal from the current cell may become weak. To assist in determining when to perform a hand off, the wireless communications device may monitor signals, such as the pilot signal, from other cell base stations. When the wireless communications device identifies another cell having a more desirable signal quality, then the wireless communications device may request that the network be transferred to the more desirable cell. Thus, for example, the conventional communications device may switch from a frequency $f_1$ in, for example, the personal communications services (PCS) band of the first cell to another frequency $f_2$ that is in the PCS band of the second cell. Such hand offs from one frequency in one cell to another frequency in another cell within the same communications band provide very limited options toward the goal of optimizing communications signals and are only provided in the area between cells. For example, a conventional wireless device operating in the PCS band may assist in performing hand offs between PCS base stations. However, if the current PCS signal fades and a stronger PCS pilot is not found, then a call may be dropped.

SUMMARY OF THE INVENTION

The present invention alleviates to a great extent the disadvantages of conventional apparatus and methods for wireless communications.

In an exemplary embodiment, the present invention provides a system and a method for providing auxiliary reception in a wireless communications device. The wireless communications device includes two antennas. In such an arrangement, one antenna may be used to establish two-way communications with a wireless communications network, while the other antenna performs auxiliary functions. The auxiliary functions may include, for example, enabling mobile assisted hand off (MAHO) between communications bands and modes, implementing a diversity antenna system or providing a GPS signal to a global positioning system (GPS) system.

The present invention has an advantage in that he wireless communications device may be enabled to scan and to evaluate other channels, bands or modes of wireless communications in determining whether a MAHO should be initiated. Thus, for example, the main antenna system of the wireless communications device may be enabled to hand off or to switch to another channel, band or mode of wireless communications.

The present invention also has an advantage in that the wireless communications device may be enabled to improve the signal quality received by the wireless communications device by receiving the signal via the auxiliary antenna instead of or in combination with the signal received via the main antenna.

The present invention further has an advantage in that the auxiliary antenna may be constructed to also provide location information by receiving GPS signals. The location information determined from the GPS signals can be, for example, displayed or transmitted via the wireless communications device.

These and other features and advantages of the present invention will be appreciated from review of the following detailed description of the present invention, along with the accompanying figures in which like reference numerals refer to like parts throughout.

DETAILED DESCRIPTION OF THE INVENTION

Figure 1:
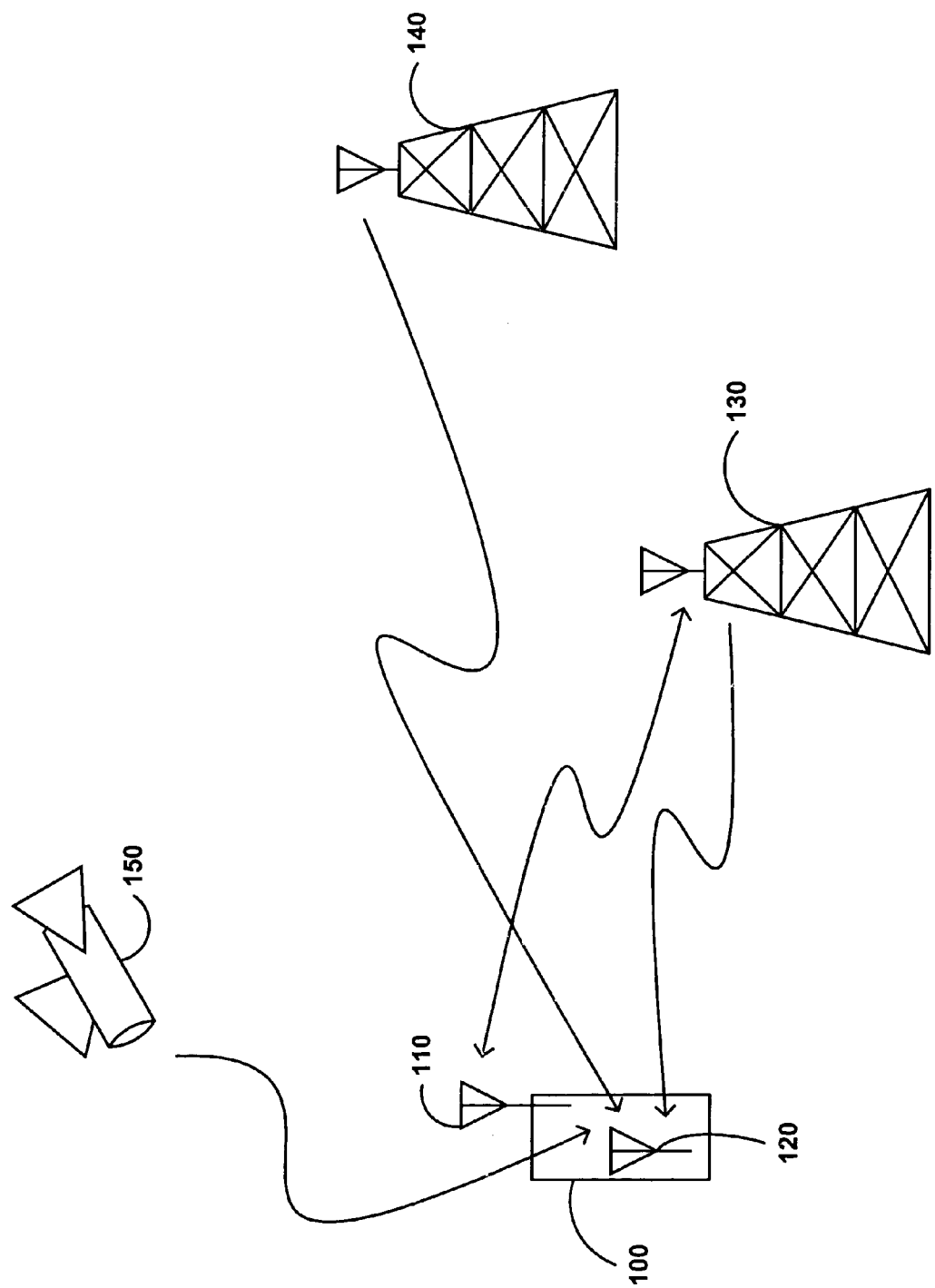
FIG. 1 shows a representation of an auxiliary reception system in a wireless communications system according to the present invention.

FIG. 1 illustrates an exemplary embodiment of a wireless communications system according to the present invention. The wireless communications system includes a wireless communications device 100. The wireless communications device 100 may include, for example, a handheld wireless communications device, a mobile phone, a car phone, a cellular or a personal communications services (PCS) phone, a cordless phone, a laptop computer or other computing device with a wireless modem, a pager or a personal digital assistant (PDA). The wireless device 100 may be digital or analog or some combination thereof. Indeed, the wireless communications device 100 may be any type of wireless communications device or combinations thereof known to one of ordinary skill in the art.

The wireless communications device 100 may include two antennas, such as a main antenna 110 and an auxiliary antenna 120. As illustrated in FIG. 1, the main antenna 110 is in two-way communications with a first base station 130. The first base station 130 may be, for example, one of a plurality of base stations in a wireless communications network. The auxiliary antenna 120 is in at least one-way communications with the first base station 130, a second base station 140 or a satellite 150. The second base station 140 may be, for example, another base station of the plurality of base stations in the wireless communications network. The satellite 150 may be, for example, one of a plurality of satellites such as in, for example, a constellation of global positioning system (GPS) satellites and their ground stations.

In operation, the wireless communications device 100 can establish two-way communications with the wireless communications network via, for example, the main antenna 110 being in wireless communications with the first base station 130. The wireless communications device 100 may then use the auxiliary antenna 120, for example, to assist in providing an enhanced mobile assisted hand off (MAHO), a diversity antenna system, or a GPS system. It will be appreciated that the wireless communications device 100 may distribute functionality between the antennas in an intelligent manner. For example, the wireless communications device 100 may determine that network communications would be better established on the auxiliary antenna 120. Subsequently, the wireless communications device 100 may use the auxiliary antenna 120 to provide the main functions and the main antenna 110 to provide the auxiliary functions.

In enabling an enhanced MAHO functionality, the wireless communications device 100 receives signals from at least one base station (e.g., the first base station 130 or the second base station 140) within range of the wireless communications device 100. The received signals can be from a plurality of bands or a plurality of channels within the bands. For example, the received signals can be from channels of the cellular band (i.e., a band at approximately 800 MHz), the PCS band (i.e., a band at approximately 1900 MHz) or other bands known to those of ordinary skill in the art. Via the auxiliary antenna 120, the wireless communications device 100 can monitor, for example, the clarity, strength or other characteristics of other channels or bands in deciding whether to switch the channels or the bands through which information is received or transmitted by the main antenna 110.

In addition, not only can the wireless communications device 100 monitor other channels or bands, but the wireless communications device 100 may also monitor different modes. Thus, for example, the wireless communications device 100 may be monitoring signals transmitted according to code division multiple access (CDMA), time division multiple access (TDMA), advanced mobile phone service (AMPS) or any other modes known to one of ordinary skill in the art. Accordingly, the wireless communications device 100 can perform a MAHO across modes, for example, from CDMA to TDMA. Thus, the wireless communications device 100 can switch, for example, from receiving or transmitting CDMA signals to receiving or transmitting TDMA signals via the main antenna 110.

The wireless communications device 100 may also employ the auxiliary antenna 120 as a diversity antenna. The auxiliary antenna 120 may or may not be oriented in the same direction as the main antenna 110. For example, in a preferred orientation, the auxiliary antenna 120 may be approximately orthogonal to the main antenna 110. Furthermore, the auxiliary antenna 120 may or may not extend outside the housing of the wireless communications device 100. If the wireless communications device 100 determines that the reception of the signal from the first base station 130 (i.e., the base station that is in two-way communications with the wireless communications device 100 via the main antenna 110) would be improved if received by the auxiliary antenna 110, then the wireless communications device 100 can adapt by receiving the signal through the auxiliary antenna 120 instead of the main antenna 110. Alternatively, the wireless communications device 100 can adapt by appropriately combining the signal received via the auxiliary antenna 120 and the signal received via the main antenna 110. In this manner it is feasible to sum the desired signals coherently while at the same time suppressing to some extent unwanted interference.

In addition, the wireless communications device 100 may be configured to receive location information from a GPS system via the auxiliary antenna 120. It will be appreciated that the auxiliary antenna function may be implemented using one or more auxiliary antennas. The wireless communications device 100 may also access the GPS system periodically, aperiodically, automatically, semi-automatically or manually. Thus, for example, the wireless communications device 100 can receive GPS data via the auxiliary antenna 120 when a user dials 911 (or some other emergency string of digits), and subsequently transmit location information via, for example, the main antenna 110 or the auxiliary antenna 120 to a desired destination via the wireless communications network. In another example, a base station (e.g., the first base station 130) can request location information from the wireless communications device 100. Upon receipt of such a request, the wireless communications device 100 can then receive GPS information via the auxiliary antenna 120 before processing the information and, subsequently, transmitting location information to the wireless communications network via, for example, the main antenna 110 or the auxiliary antenna 120. In yet another example, a user of the wireless communications device 100 can actuate, for example, a special GPS function key on the keypad of the wireless communications device 100 that results in the wireless communications device 100 receiving and processing GPS data via the auxiliary antenna 120 before, for example, displaying the location information on a display screen of the wireless communications device 100.

Figure 2:
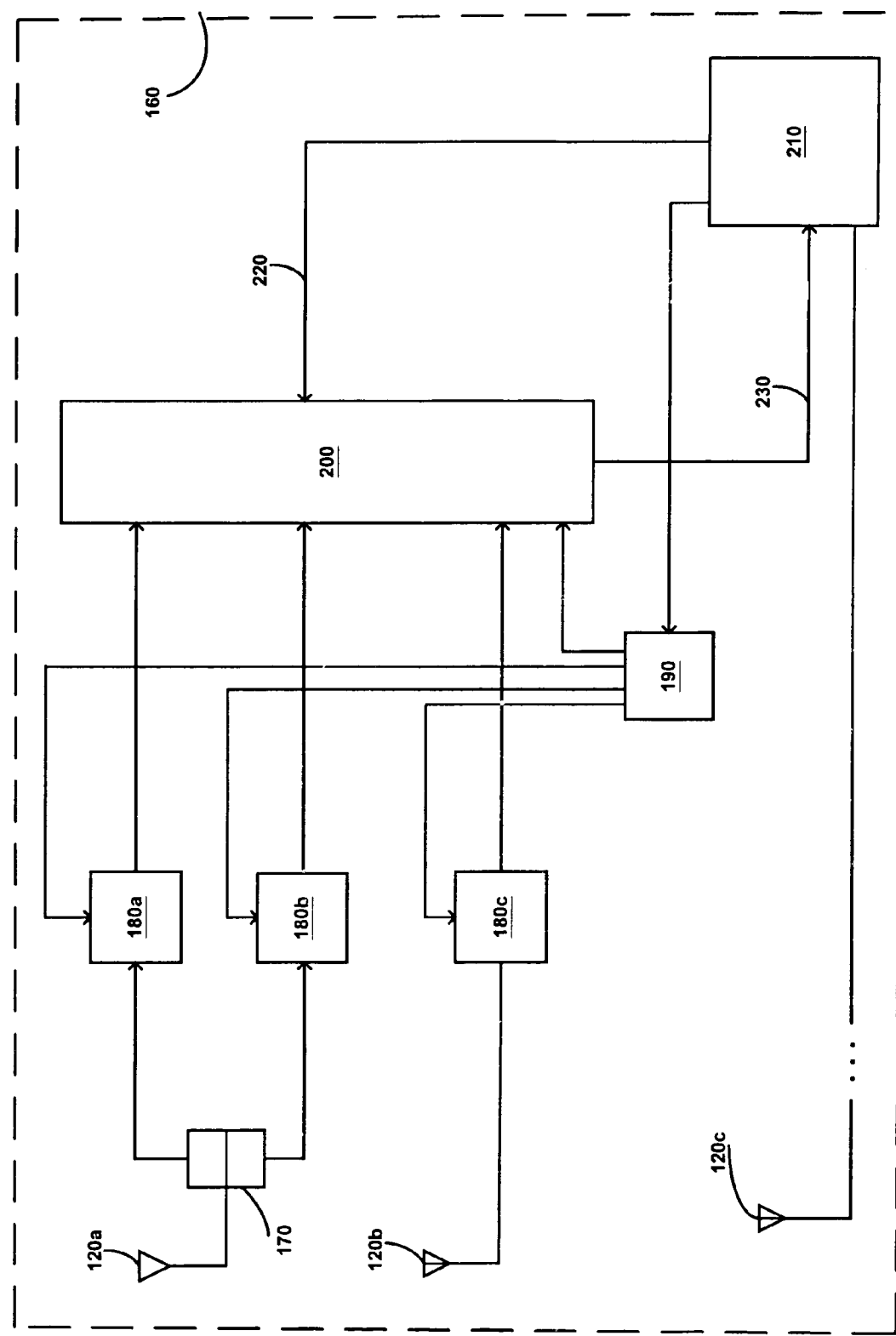
FIG. 2 shows a schematic representation of an exemplary embodiment of the auxiliary reception system according to the present invention.

FIG. 2 shows a schematic representation of an exemplary embodiment of an auxiliary reception system 160 according to the present invention. The auxiliary reception system 160 may be part of the wireless communications device 100 and may include two auxiliary antennas 120*a–b*. For example, the first auxiliary antenna 120*a* may be a dual band antenna for receiving cellular or PCS signals and the second auxiliary antenna 120*b* may be a GPS antenna. Alternatively, a single auxiliary antenna 120 can be used instead of the two auxiliary antennas 120*a–b*. The auxiliary reception system 160 also may include a duplexer 170, signal processing modules 180*a–c*, a selector module 190, an auxiliary controller 200 or a main controller 210.

As illustrated in FIG. 2, a first auxiliary antenna 120*a* is coupled to the duplexer 170. The duplexer 170 is coupled to a first signal processing module 180*a* and to a second signal processing module 180b. The first signal processing module 180a and the second signal processing module 180b are each coupled to the selector module 190 and the auxiliary controller 200. A second auxiliary antenna 120b is coupled to a third signal processing module 180c. The third signal processing module 180c is coupled to the selector module 190 and the auxiliary controller 200. The selector module 190 is coupled to the auxiliary controller 200 and to the main controller 210. The auxiliary controller 200 is coupled to the main controller 200.

Figure 3:
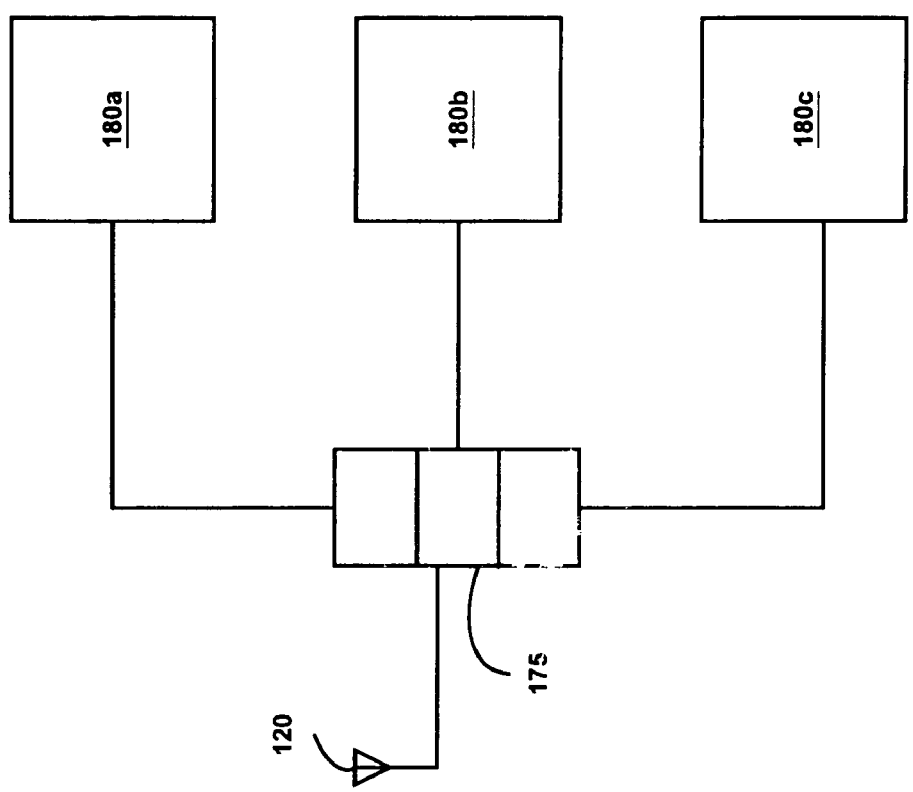
FIG. 3 shows an exemplary embodiment of a portion of the auxiliary reception system according to the present invention.
Figure 4:
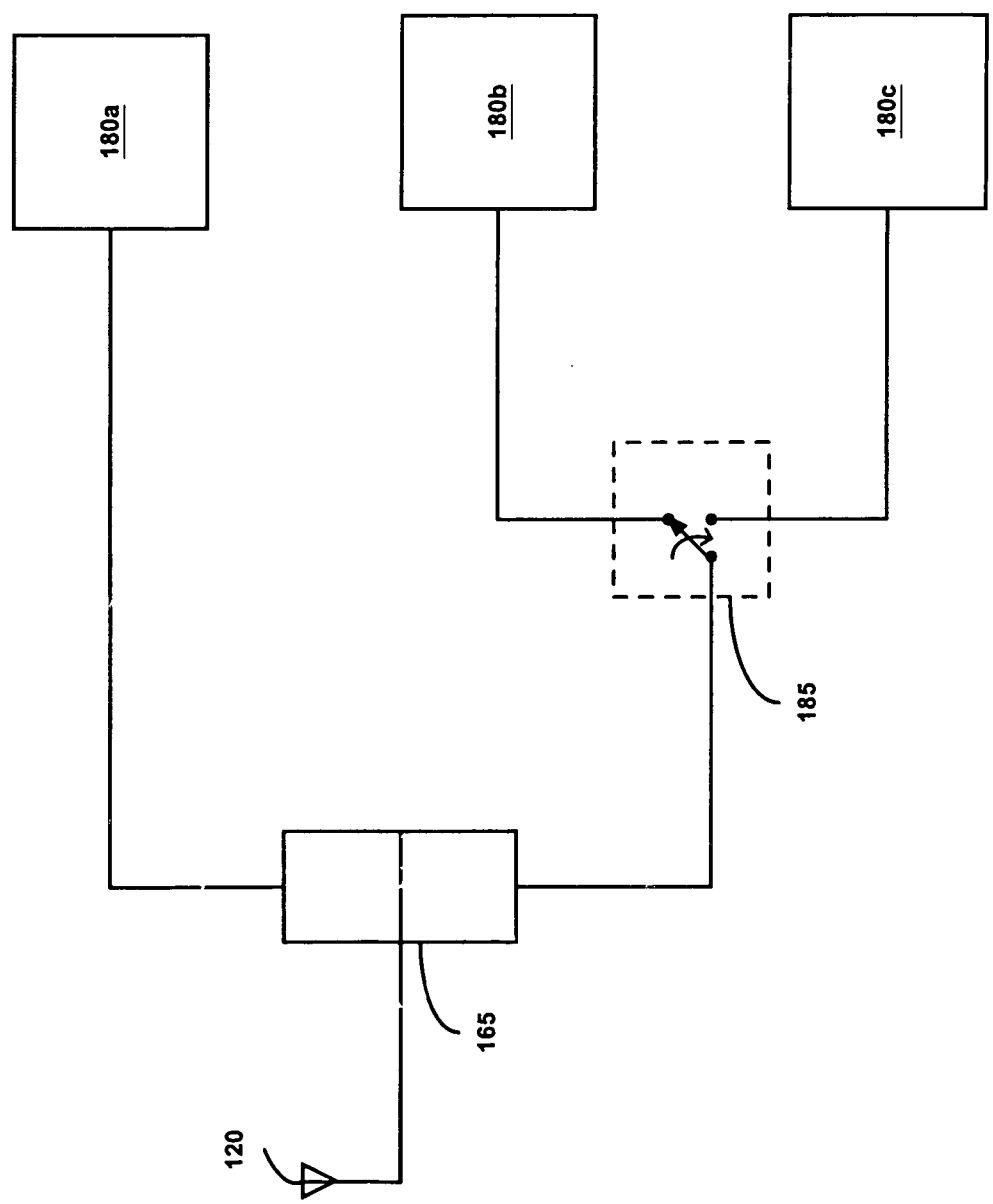
FIG. 4 shows an exemplary embodiment of a portion of the auxiliary reception system according to the present invention.

Other exemplary embodiments may include various levels of integration not illustrated in FIG. 2. For example, the first auxiliary antenna 120a and the second auxiliary antenna 120b can be integrated into a single auxiliary antenna 120. In such an example, a triplexer 175 may be employed instead of the duplexer 170 as indicated in FIG. 3. In another example, the duplexer 170 can split the received communications signal into, for example, cellular band signals and GPS/PCS band signals as shown in FIG. 4. The latter example may optionally include, for example, a switching module 185 or additional circuitry in the signal processing module 180c that tunes the received signal to the GPS band. In such an example, the high pass filter of the diplexer 165 may be adapted (e.g., lowering the cutoff frequency of the high pass filter) to not only pass the PCS band, but also the GPS band, with an acceptable level of attenuation. Alternatively, an adapted duplexer may be used instead of the diplexer 165. Other levels of integration may be achieved especially such as by combining parts of the signal processing modules 180b–c such as, for example, circuitry for PCS/GPS mixing or CDMA/GPS IF filtering. In addition, components illustrated in FIG. 2 can also be used by the circuitry related to the main antenna 120. For example, the main controller 210 or the selector module 190 may be employed to carry out conventional functions in receiving or transmitting wireless communications signals in, for example, the cellular band or the PCS band. Some of these exemplary embodiments will be further described below.

In operation, as illustrated in FIG. 2, the first auxiliary antenna 120a receives cellular or PCS communications signals. The second auxiliary antenna 120b receives GPS signals. The duplexer 170 splits the received cellular/PCS signals and filters the signals into cellular band signals and PCS band signals. The cellular band signals are directed to the first signal processing module 180a; the PCS band signals are directed to the second signal processing module 180b; and the GPS signals are directed to the third signal processing module 180c. The first signal processing module 180a, the second signal processing module 180b and the third signal processing module 180c amplify and further filter the signals in the cellular band, the PCS band and the GPS band, respectively. In addition, the first signal processing module 180a, the second signal processing module 180b and the third signal processing module 180c mix and filter to the intermediate frequency (IF) band according to selection signals generated by the selector module 190 as controlled by the main controller 210. Subsequently, the first signal processing module 180a, the second signal processing module 180b and the third signal processing module 180c direct the IF band filtered signals to the auxiliary controller 200.

The auxiliary controller 200 receives low level signals from the signal processing modules 180a–c and then amplifies the low level signal by an amount set by the auxiliary automatic gain control (AGC) loop 220 which is controlled by the main controller 210. The amount set by the auxiliary AGC loop 220 amplifies the low level signals to at least a level such that, for example, an in-phase and quadrator (IQ) demodulator of the auxiliary controller 200 can function and such that, for example, the amplified signal falls within the dynamic range of an analog-to-digital converter (ADC) of the auxiliary controller 200. The digitized information (e.g., amplitude or phase of time variant signals) is then directed, via data line or bus 230 to the main controller 210 where the digitized information is further processed.

Accordingly, the wireless communications device 100 may be in two-way communications with a wireless communications network via the main antenna 100 while monitoring other channels, bands or modes. For example, in monitoring other channels within the band being used by the main antenna 100, the main controller 210 may control the selector module 190 such that the signal processing modules 180a–c selectively filter different channels in the band. The auxiliary controller 200 via, for example, the auxiliary AGC and the IQ demodulator, ascertains information (e.g., amplitude or phase parameters) about the signals in the channels of the band. This ascertained information is then digitized and sent to the main controller 210. Information about each channel in the band can then be evaluated or compared by the main controller 210 with, for example, the channel in the band being used by the main antenna 110 in determining whether the main controller 210 should, for example, switch the main antenna 110 to the most effective channel. In another embodiment, the auxiliary reception system 160 can monitor signals received from other channels in other bands, or signals received from other modes of wireless communications. Thus, for example, the main controller 210 may determine that signals from the cellular band are more effective than signals from the PCS band; or, for example, that signals in CDMA mode are more effective than signals in TDMA mode or AMPS mode.

Furthermore, the GPS data signal received by the auxiliary controller 200 via the second auxiliary antenna 120b can be forwarded to the main controller 210. The main controller 210 can then process the GPS data signal and extract the desired location information. The location information can be displayed by the main controller 210 on, for example, a display screen of the wireless communications device 100. The main controller 210 can also transmit the location information via the main antenna 110 or the auxiliary antenna 120 to a desired destination via, for example, the wireless communications network. Thus, for example, if an emergency string of digits such as, for example, 911, is entered on the keypad, the main controller 210 can automatically transmit location information on the main antenna 110 or the auxiliary antenna 120 to, for example, the other party (e.g., nearest police station) connected as a result of dialing 911. In another example, the main controller 210 may receive, via the main antenna 110, an inquiry as to the location of the wireless communications device 100. In response, the main controller 110 may reply by transmitting the location information on the main antenna 110 or the auxiliary antenna 120 to the inquirer.

In addition, the first auxiliary antenna 120a may provide diversity reception. For example, the main controller 210 may receive signals from the main antenna 110 in a particular channel, band or mode. The main controller 210 may determine that the particular channel, band or mode is more effectively received from the first auxiliary antenna 120a. Accordingly, the main controller 210 can then switch to receiving the particular channel, band or mode from the first auxiliary antenna 120a instead of the main antenna 110. Alternatively, the main controller 210 may determine that the particular channel, band or mode is more effectively received by appropriately combining the signal from the first auxiliary antenna 120*a* and the signal from the main antenna 110.

Just as the first auxiliary antenna 120*a* may provide auxiliary reception, a third auxiliary antenna 120*c* may provide auxiliary transmission. Although not shown in detail in FIG. 2, the third auxiliary antenna 120*c* may be disposed at an angle with respect to the main antenna 110. Accordingly, the transmission characteristics of the third auxiliary antenna 120*c* may be advantageous such that main controller 210 routes main transmission through the third auxiliary antenna 120*c* instead of the or in combination with the main antenna 110. In addition, the third auxiliary antenna 120*c* may be integrated with the first auxiliary antenna 120*a*.

Figure 5:
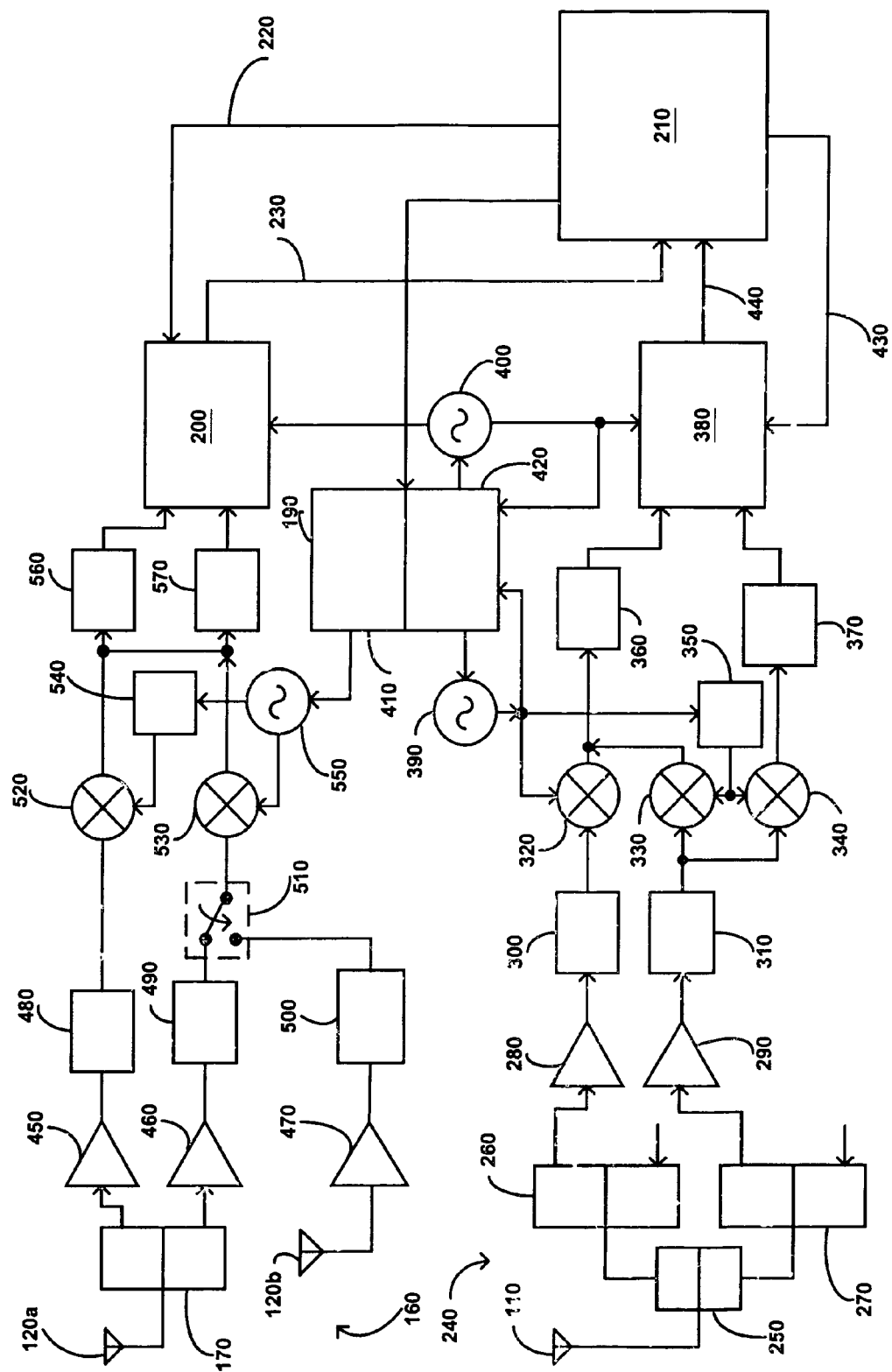
FIG. 5 shows an exemplary embodiment of the auxiliary reception system and the main antenna system according to the present invention.

FIG. 5 shows an exemplary embodiment of the auxiliary reception system 160 and some components of an exemplary embodiment of a main antenna system 240 according to the present invention. Only some of the components of the main antenna system 240 are shown since many of the components of the main antenna system 240 are known to one of ordinary skill in the art.

In an exemplary embodiment, the main antenna system 240 may include, for example, the main antenna 110, a cellular/PCS diplexer 250, a PCS duplexer 260, a cellular duplexer 270, a PCS low noise amplifier (LNA) 280, a cellular LNA 290, a PCS band filter 300, a cellular band filter 310, a PCS mixer 320, a CDMA mixer 330, an FM mixer 340, a frequency divider 350, a CDMA IF filter 360, an FM IF filter 370, a main IF demodulator 380, the main controller 210, the selector module 190, a first oscillator 390 or a second oscillator 400.

In an exemplary embodiment, the main antenna system 240 is designed to receive and transmit communications signals in, for example, at least two bands. Thus, for example, the main antenna 110 may be a dual band antenna tuned to receive and to transmit cellular or PCS band communications signals. In addition, FIG. 5 illustrates that some components used in both the auxiliary reception system 160 and the main antenna system 240 may be combined. Accordingly, the main controller 210 which may include, for example, a mobile station modem (MSM), may be used by both the auxiliary reception system 160 and the main antenna system 240. In another example, the selector module 190 may include a combination of, for example, a single phase locked loop integrated circuit (PLL IC) 410 for the auxiliary reception system 160 and a dual PLL IC 420 for the main antenna system 240.

As illustrated in FIG. 5, the main antenna 110 is coupled to the cellular/PCS diplexer 250. The cellular/PCS diplexer 250 is coupled to the PCS duplexer 260. The PCS duplexer 260 is coupled to the PCS LNA 280 via a reception port of the PCS duplexer 260 and to a PCS transmission chain of components (not shown) on a transmission port of the PCS duplexer 260. The PCS LNA 280 is coupled to the PCS filter 300 which, in turn, is coupled to the PCS mixer 320. The PCS mixer 320 is coupled to the first oscillator 390 which, in turn, is coupled to the selector module 190 and, in an exemplary embodiment, the first oscillator 390 is coupled to the dual PLL IC 420 of the selector module 190. The PCS mixer 320 is also coupled to the CDMA IF filter 360 which, in turn, is coupled to the main IF demodulator 380. The main IF demodulator 380 is coupled to the selector module 190 via the second oscillator 400 and, in an exemplary embodiment, the main IF demodulator 380 is coupled to the dual PLL IC 420 via the second oscillator 400. The main IF demodulator 380 is also coupled to the main controller 210.

Although the wireless communications device may operate in accordance with a heterodyne system (e.g., superheterodyne receiver system), the wireless communications device may also or alternatively operate in accordance with other systems such as, for example, a direct down conversion system.

The cellular/PCS diplexer 250 is also coupled to the cellular duplexer 270. The cellular duplexer 270 is coupled to the cellular LNA 290 via a reception port of the cellular duplexer 270 and to a cellular transmission chain of components (not shown) via a transmission port of the cellular duplexer 270. The cellular LNA 290 is coupled to the cellular filter 310 which, in turn, is coupled to the CMDA mixer 330. The CDMA mixer 330 is coupled to the CDMA IF filter 360 which, in turn, is coupled to the main IF demodulator 380. The CDMA mixer 330 is also coupled to the first oscillator 390 via the frequency divider 350. The cellular filter 310 is also coupled to the FM mixer 340. The FM mixer 340 is coupled to the FM IF filter 370 which, in turn, is coupled to the main IF demodulator 380. The FM mixer 340 is also coupled to the first oscillator 390 via the frequency divider 350.

In operation, the main antenna 110 may be used to receive and to transmit, for example, cellular/PCS band signals. Thus, for example, PCS band signals can be received via the main antenna 110. The cellular/PCS diplexer 250 passes, via an internal high pass filter, the PCS band signals through the PCS duplexer 260. Via the reception port of the PCS duplexer 260, the signal is amplified by the PCS LNA 280 before being filtered by the PCS band filter 300 (e.g., an approximately 1960 MHz band filter). In the PCS mixer 320, the filtered signal is subsequently mixed with a signal (e.g., single band VCO approximately 2.15 GHz) generated by the first oscillator 390 as dictated by the selector module 190 and, in an exemplary embodiment, the dual PLL IC 420. The selector module 190 is controlled by programming stored or executed in the main controller 210. The CDMA IF filter 360 (e.g., a CDMA approximately 183.6 MHz) then passes the IF frequencies. The IF signals received by the main IF demodulator can then be amplified according to a main receiver AGC loop 430. The main IF demodulator 380 then demodulates the IF signals using a signal generated by the second oscillator 400 as dictated by the selector module 190 and digitizes the information which is sent to the main controller 210 via a line or a bus 440. The information is then further processed by the main controller 210.

A similar path is followed in the cellular branch of the main antenna system 240. Thus, for example, cellular band signals can also be received via the main antenna 110. The cellular/PCS diplexer 250 passes, via an internal low pass filter, the cellular band signals through the cellular duplexer 270. Via the reception port of the cellular duplexer 270, the signal is amplified by the cellular LNA 290 before being filtered by the cellular band filter 310 (e.g., an approximately 880 MHz band filter).

In the CDMA mixer 330 or the FM mixer 340, the filtered signal is subsequently mixed with a signal generated by the first oscillator 390 and transformed by the frequency divider 350. For example, the frequency divider 350 can receive the signal generated by the first oscillator 390 and reduce the frequency of the signal in half before forwarding the transformed signal to the CMDA mixer 330 and the FM mixer 330. The CDMA mixed signal is then coupled to the CDMA IF filter 360 before proceeding as described above. In another path, the FM mixed signal is then filtered by the FM IF filter 370 (e.g., an FM approximately 183.6 MHz filter)

before being coupled to the main IF demodulator 380 before proceeding as described above.

In an exemplary embodiment, the auxiliary reception system 160 may include, for example, the first auxiliary antenna 120a, the second auxiliary antenna 120b, the duplexer 170 (e.g., a cellular/PCS duplexer), a cellular LNA 450, a PCS LNA 460, a GPS LNA 470, a cellular band filter 480, a PCS band filter 490, a GPS band filter 500, a switching module 510, a cellular CDMA/FM mixer 520, a PCS/GPS mixer 530, a frequency divider 540, a third oscillator 550, an FM IF filter 560, a CDMA/GPS IF filter 570, the auxiliary controller 200, the second oscillator 400, the selector module 190 or the main controller 210.

In operation, the first auxiliary antenna 120a may be used to receive, for example, cellular/PCS band signals. Thus, for example, cellular band signals can be received via the first auxiliary antenna 120a. The cellular/PCS duplexer 170 filters the received signal, band passing the cellular band signals to the cellular LNA 450 (e.g., an approximately 800 MHz LNA), where they are amplified. The amplified signal is then filtered by the cellular band filter 480 (e.g., an approximately 800 MHz band filter). Subsequently, in the cellular CDMA/FM mixer 520, the filtered signal is mixed with a signal which is generated by the third oscillator 550 and transformed by the frequency divider 540. The frequency divider 540 may, for example, reduce by half the frequency of the signal generated by the third oscillator 540. The signal generated by the third oscillator 550 is dictated by the selector module 190 and, in an exemplary embodiment, the single PLL IC 420 for auxiliary reception. The selector module 190 is controlled by programming stored or executed in the main controller 210. The mixed signal is then sent to FM IF filter 560 and the CDMA/GPS IF filter 570. The FM IF filter 560 filters out the FM signals and passes them to the auxiliary controller 200. The CDMA/GPS IF filter 570 passes only CDMA or GPS signals of interest to the auxiliary controller 200. The auxiliary controller 200 may include, for example, an auxiliary diversity/watch IF demodulator. The auxiliary controller 200 amplifies the filtered signal to a level as set by the auxiliary AGC loop 220. The amplified signal then can be, for example, demodulated with a signal generated by the second oscillator 400 which, itself, is controlled by the selector module 190 and, in an exemplary embodiment, is controlled by the dual PLL IC 420. The amplified signal is then digitized by, for example, an ADC in the auxiliary controller 200. The digitized signal can then be sent to the main controller 210 for further processing.

PCS band signals can also be received via the first auxiliary antenna 120a. The cellular/PCS duplexer 170 filters the received signal, band passing the PCS band signals to the PCS LNA 460 (e.g., an approximately 1960 MHz LNA), where they are amplified. The amplified signal is then filtered by the PCS band filter 480 (e.g., an approximately 800 MHz band filter). In an exemplary embodiment, the filtered signal passes through the switching module 510. The switching module 510 connects either the PCS band signals or the GPS band signals to the PCS/GPS mixer 530. The switching module 510 can be controlled, for example, by the main controller 210. Subsequently, in the PCS/GPS mixer 530, the filtered signal is mixed with a signal which is generated by the third oscillator 550. The mixed signal is then sent to FM IF filter 560 and the CDMA/GPS IF filter 570. The signal is then further processed as described above.

GPS signals may be received, for example, in the second antenna 120b or via a single antenna 120. As illustrated in FIG. 5, GPS signals are received by the second antenna 120b and amplified by the GPS LNA 470, before being filtered by the GPS band filter 500. The filtered signal passes through the switching module 510 to the PCS/GPS mixer 530. The PCS/GPS mixer 530 mixes the filtered signal with a signal generated by the third oscillator 550, before being filtered by the CDMA/GPS IF filter 570. The GPS signal is then amplified and processed in the auxiliary controller 200 before being further processed in the main controller 210.

In an exemplary embodiment, the main antenna system 240 gives priority to two-way communications with a wireless communications network. However, while the wireless communications device 100 is in two-way communications, the wireless communications device 100 can assign a lower priority to scanning other channels, bands or modes via the first auxiliary antenna 120a. A scanning order for channels, bands or modes is determined by the main controller 210 via, for example, a list stored in a memory of the main controller 210. The scanning is achieved, for example, by the selector module 190 as controlled by the main controller 210. Decisions as to which channels, bands or modes to scan can also be determined in light of information received via the line or bus 230. If the main controller 210 determines that there is a much better channel, band or mode available, the main controller 210 can switch the main antenna system 240 to the better channel, band or mode. Such scanning can occur, for example, at periodic intervals or as a function of a triggering condition such as, for example, reaching a threshold signal strength.

In another exemplary embodiment, the main controller 210 may monitor the particular channel, band or mode that is in use by the main antenna 110 and have the first auxiliary antenna 120a receive the same signal at the same particular channel, band or mode as the main antenna 110. The auxiliary antenna 120a, which may be in a different orientation than the main antenna 110, may be more effective at receiving the signal for the particular channel, band or mode than the main antenna 110. As a result, the main controller 210 may switch the reception tasks from the main antenna 110 to the auxiliary antenna 120a. Alternatively, the main controller 210 may use the signals received from both the first auxiliary antenna 120a and the main antenna 110 in creating a composite signal that may be, for example, of greater strength or clarity.

Furthermore, the main controller 210 can receive GPS signals via the second auxiliary antenna 120b or the auxiliary antenna 120, if there is only one auxiliary antenna. The GPS signals can be processed and the location information can be displayed or transmitted via, for example, the main antenna 110 or the auxiliary antenna 120 as has been described above.

Thus, it is seen that systems and methods for providing auxiliary reception in wireless communications systems are provided. One skilled in the art will appreciate that the present invention can be practiced by other than the preferred embodiments which are presented in this description for purposes of illustration and not of limitation, and the present invention is limited only by the claims that follow. It is noted that equivalents for the particular embodiments discussed in this description may practice the present invention as well.

What is claimed is:

1. An antenna system for a wireless communications device comprising:
   a main antenna system with full duplex capability, coupled to the wireless communications device, and configured to receive communications signals according to a first mode and a first band;

an auxiliary reception system comprising:
an auxiliary antenna,
a first processing module, selectably connected to the auxiliary antenna and configured to receive communications signals according to the first mode and the first band,
a second signal processing module selectably connected to the auxiliary antenna, and configured to receive an auxiliary signal, and
a selector module selectably connected to the first and second signal processing modules; and
a controller operatively connected to the main antenna system and the selector module, the controller configured to separately receive signals communicated on the main antenna system and the auxiliary reception system, the selector module configured to pass one-of the second communications signals and the auxiliary signal to the controller.

2. The antenna system of claim 1 wherein after the auxiliary reception system is limited to half-duplex operation.

3. The antenna system of claim 1, wherein the controller is further configured to selectably receive one of the first communication signals via the main antenna system and the second communication signals via the auxiliary reception system.

4. The antenna system of claim 3, wherein the main antenna system comprises a main antenna, wherein the auxiliary antenna is in diversity with the main antenna.

5. The antenna system of claim 4, wherein the auxiliary antenna is disposed approximately orthogonal to the main antenna.

6. The antenna system of claim 1, wherein the main antenna system is further configured to receive the first communications signals according to a first channel, wherein the first signal processing module is configured to receive the second communications signals according to a second channel different from the first channel.

7. The antenna system of claim 1, wherein the second signal processing module is configured to receive the auxiliary signal according to a second band different from the first band.

8. The antenna system of claim 7, wherein the second signal processing module is configured to receive GPS signals.

9. The antenna system of claim 1, wherein the second signal processing module is configured to receive the auxiliary signal according to a second mode.

10. The antenna system of claim 1, wherein the auxiliary antenna system further comprises a third signal processor selectably connected to the auxiliary antenna, selectably connected to the selector module and configured to receive third communication signals according to the first mode and a second band.

11. A method for providing enhanced reception in a diversity antenna system, the diversity antenna system comprising a main antenna system and an auxiliary receptions system, the method comprising:
establishing full-duplex communications via the main antenna system, the full duplex communications comprising first communications signals according to a first mode and a first band;
selectably connecting an auxiliary antenna to a first signal processing module;
receiving second communication signals via the auxiliary antenna and the first signal processing module, the second communication signals comprising signals according to the first mode and the first band;
selectably connecting the auxiliary antenna to a second signal processing module;
receiving an auxiliary signal via the auxiliary antenna and the second signal processing module;
passing one of the second communications signals and the auxiliary signal; and
separately receiving the first communication signals and the passed one of the second communication signals and the auxiliary signals.

12. The method of claim 11, wherein the auxiliary signal comprises GPS band signals, the method further comprising determining location information from the GPS band signals.

13. The method of claim 12, further comprising transmitting the determined location information via the main antenna system.

14. The method of claim 11, wherein the selectably connecting the auxiliary antenna to the second signal processing module is carried out when the reception quality of the first communication signals is higher than the reception quality of the second communication signals.

15. The method of claim 11, wherein the selectably connecting the auxiliary antenna to the first signal processing module is carried out when the reception quality of the second communication signals is higher than the reception quality of the first communication signals.

16. The method of claim 11, wherein the auxiliary reception system is limited to half-duplex operation.

* * * * *

UNITED STATES PATENT AND TRADEMARK OFFICE
CERTIFICATE OF CORRECTION

PATENT NO. : 7,181,171 B2  
APPLICATION NO. : 09/909748  
DATED : February 20, 2007  
INVENTOR(S) : Timothy David Forrester Page 1 of 1

It is certified that error appears in the above-identified patent and that said Letters Patent is hereby corrected as shown below:

Column 10, line 62  
Claim 1 should read:

-- 1. An antenna system for a wireless communications device comprising:
 a main antenna system with full duplex capability, coupled to the wireless communications device, and configured to receive first communications signals according to a first mode and a first band;
  an auxiliary reception system comprising:
   an auxiliary antenna,
   a first signal processing module, selectably connected to the auxiliary antenna and configured to receive second communications signals according to the first mode and the first band,
   a second signal processing module selectably connected to the auxiliary antenna, and configured to receive an auxiliary signal, and
   a selector module selectably connected to the first and second signal processing modules; and
  a controller operatively connected to the main antenna system and the selector module, the controller configured to separately receive signals communicated on the main antenna system and the auxiliary reception system, the selector module configured to pass one-of the second communications signals and the auxiliary signal to the controller. --

Signed and Sealed this

Twentieth Day of May, 2008

JON W. DUDAS  
*Director of the United States Patent and Trademark Office*